United States Patent [19]

Bos

[11] Patent Number: 4,719,507
[45] Date of Patent: Jan. 12, 1988

[54] STEREOSCOPIC IMAGING SYSTEM WITH PASSIVE VIEWING APPARATUS

[75] Inventor: Philip J. Bos, Portland, Oreg.

[73] Assignee: Tektronix, Inc., Beaverton, Oreg.

[21] Appl. No.: 727,481

[22] Filed: Apr. 26, 1985

[51] Int. Cl.[4] ............................................. H04N 13/00
[52] U.S. Cl. ....................................... 358/92; 358/88; 350/132
[58] Field of Search ......................... 358/3, 88, 91, 92; 350/130, 132; 353/7, 8; 354/112

[56] References Cited

U.S. PATENT DOCUMENTS

| | | | |
|---|---|---|---|
| 3,737,567 | 6/1973 | Kratomi | 358/92 |
| 3,858,001 | 12/1974 | Bonne | 358/92 |
| 4,021,846 | 5/1977 | Roese | 358/92 |
| 4,281,341 | 7/1981 | Byatt | 358/92 |
| 4,566,758 | 11/1986 | Bos | 350/346 |
| 4,582,396 | 4/1986 | Bos et al. | 350/347 G |
| 4,583,825 | 4/1986 | Buzak | 350/335 |

OTHER PUBLICATIONS

Roese and Khalafalla, "Stereoscopic Viewing With PLZT Ceramics," Ferroelectrics, vol. 10 (1976), pp. 47–51.

Balasubramonian and Gunasekaran, "On the Merits of Bicircular Polarization for Stereo Color TV," IEEE Transactions on Consumer Electronics, vol. CE-28, No. 4 (Nov. 1982), pp. 638–650.

Primary Examiner—Howard W. Britton
Assistant Examiner—John K. Peng
Attorney, Agent, or Firm—John D. Winkelman; Paul S. Angello

[57] ABSTRACT

A stereoscopic imaging system employs an image encoder that comprises a variable optical retarder which is positioned face-to-face with an image source and an image decoder that comprises only passive optical elements. In a first embodiment, the imaging system (50) uses a single variable optical retarder (22) to encode perspective view images by selectively developing zero and half-wave retardation. A passive viewing apparatus (52 and 54) employs retardation plates (56, 58, and 64) to decode the images. In a second embodiment, the imaging system (100) uses a pair of variable optical retarders (101 and 102) to encode perspective view images in left- and right-circularly polarized light. A passive viewing apparatus (106 and 108) employs quarter-wave plates (110 and 114) to decode the images. Each of the preferred embodiments is suitable for use with broadband image source phosphors and in processing perspective view images in full color.

41 Claims, 15 Drawing Figures

FIG. 9A (ON)
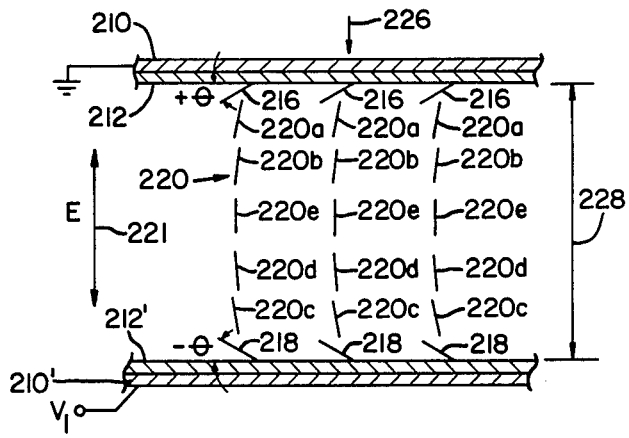
FIG. 9B (OFF)
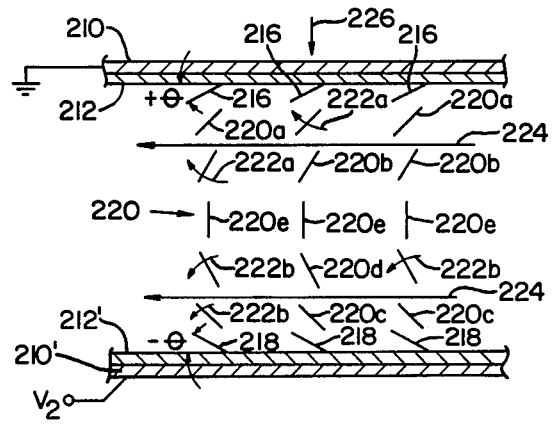
FIG. 9C (INTERMEDIATE)
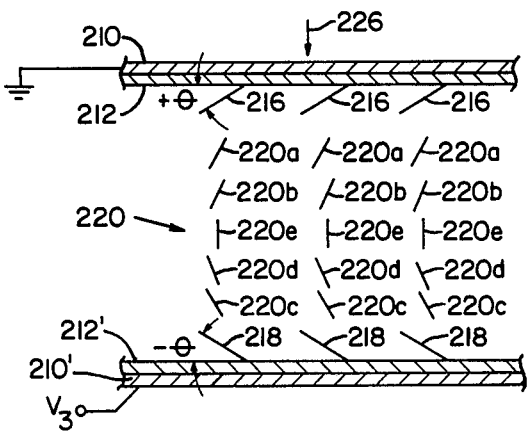

STEREOSCOPIC IMAGING SYSTEM WITH PASSIVE VIEWING APPARATUS

TECHNICAL FIELD

The present invention relates to imaging systems, and in particular, a stereoscopic imaging system that employs a variable optical retarder in cooperation with passive viewing apparatus to alternately transmit and block a perspective view image of a scene for each eye of an observer to create the visual effect of a three-dimensional image of the scene.

BACKGROUND OF THE INVENTION

Variable optical retarders have been employed heretofore in stereoscopic imaging systems. For example, the article by Roese and Khalafalla, "Stereoscopic Viewing With PLZT Ceramics," *Ferroelectrics*, Vol. 10 (1976), pp. 47–51, describes a stereoscopic viewing system that employs lead lanthanum zirconate titanate (PLZT) ferroelectric ceramics. The stereoscopic viewing system comprises a pair of PLZT devices that form the eyepieces of glasses worn by an observer. Each such device is positioned in front of one of the observer's eyes and includes an optically cemented assembly of antireflective coated glass, a front polarizer, the PLZT ceramic wafer, and a rear polarizer. A switchable power source selectively applies 0 volts and 500 volts to each PLZT device to change its birefringence and thereby change the direction of polarization of light incident on it. Changing the polarization direction of light by the PLZT device causes either the transmission or the extinction of light carrying the image before it reaches the observer's eyes.

On page 49, the article states that the imaging system would be inoperable if the front polarizer of the PLZT device assembly were removed and a polarizing sheet were placed on the screen of the imaging source. The reason is that the resulting imaging system would have a very narrow field of view because of a degradation in optical contrast ratio as the viewing angle changes from the normal to the rear polarizer surface.

The viewing system described by Roese et al. can also present a safety problem in that it requires the use of a viewing device to which a relatively high voltage is applied and which is worn by the observer.

The article by Balasubramonian and Gunasekaran, "On the Merits of Bicircular Polarization for Stereo Color TV," *IEEE Transactions on Consumer Electronics*, Vol. CE-28, No. 4 (November 1982), pp. 638–650, describes a three-dimensional viewing system based on the use of left- and right-circularly polarized light for carrying images that emanate from the screens of two color cathode ray tubes. The color cathode ray tubes present together left and right perspective view images of a scene. A neutral linear polarizing filter and a fixed quarter-wave plate are positioned in front of the screen of each cathode ray tube. The optic axes of the quarter-wave plates are parallel to each other, and the transmission axes of the polarizing filters are pendicular to each other. The perspective view images propagate in left-circularly polarized light from one cathode ray tube and in right-circularly polarized light from the other cathode ray tube.

The imaging system employs a passive viewing device comprising two eyepieces, each including a quarter-wave plate and a neutral linear polarizer to remove the circular polarization and transmit the left view image to the left eye and the right view image to the right eye. The optic axes of the quarter-wave plates are parallel to each other and parallel to the optic axes of the quarter-wave plates positioned in front of the cathode ray tube screens. The neutral linear polarizers have orthogonally aligned absorption axes. The article states that the use of left- and right-circular polarization provides three-dimensional perception that is unrestricted by the observer's head movements.

The system of Balasubramonian et al. suffers from the disadvantage of requiring two cathode ray tubes to develop a stereoscopic image.

U.S. Pat. No. 4,281,341 of Byatt describes a receiver in a stereoscopic television system that employs a twisted nematic liquid crystal cell to change the polarization direction of light carrying perspective view images emanating in field sequential format from a cathode ray tube. The twisted nematic device is positioned downstream of a linear polarizing filter which is positioned in front of the screen of the cathode ray tube and which has its transmission axis oriented in the vertical direction. An observer wears passive glasses with two eyepieces, each comprising a neutral polarizing filter. The polarization axes of the neutral polarizing filters are orthogonally aligned, with one of them aligned parallel to the polarizing filter positioned in front of the cathode ray tube screen.

The Byatt system suffers from the disadvantage of requiring the application of a relatively high voltage to the twisted nematic cell to change rapidly the polarization direction of the light carrying the perspective view images. Use of such a device at slow switching speeds causes image flicker, and use of a slow device at relatively high switching speeds develops a low contrast image.

SUMMARY OF THE INVENTION

An object of this invention is, therefore, to provide in a stereoscopic imaging system an image encoder comprising a variable optical retarder that is positioned face-to-face with the image source and an image decoder that includes only passive optical elements.

Another object of this invention is to provide an imaging system that is suitable for use with broadband image source phosphors and in processing perspective view images in full color A further object of this invention is to provide such an imaging system that employs only one imaging source.

Still another object of this invention is to provide such an imaging system whose perspective view images appear in field sequential format with high image contrast at switching speeds greater than the flicker rate.

Additional objects and advantages of the present invention will be apparent from the following detailed descriptions of preferred embodiments thereof, which proceed with reference to the accompanying drawings.

BRIEF DESCRIPTION OF THE DRAWINGS

FIGS. 9A-9C are schematic diagrams of the director alignment configuration of the liquid crystal cell of the variable optical retarders incorporated in the preferred embodiments of the stereoscopic imaging system of the present invention in, respectively, the "ON" state, the "OFF" state, and the "INTERMEDIATE" state.

DETAILED DESCRIPTIONS OF PREFERRED EMBODIMENTS

Figure 1:
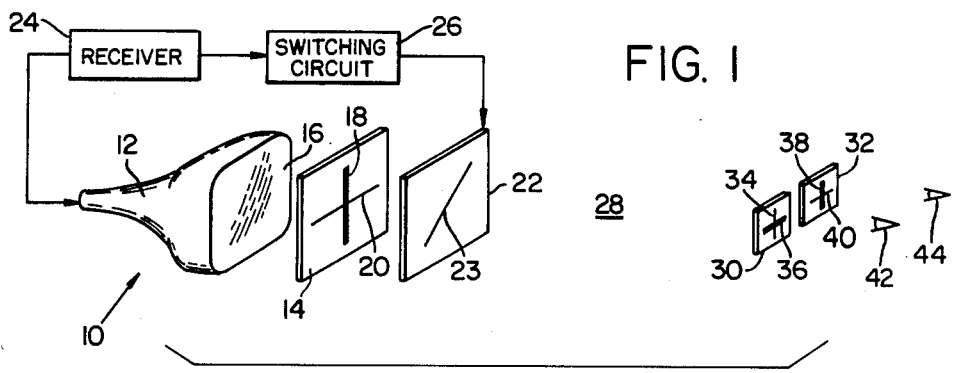
FIG. 1 is a diagram of a stereoscopic imaging system that exemplifies the problems inherent in such systems which employ a variable optical retarder and passive viewing apparatus.

FIG. 1 is a diagram of a stereoscopic imaging system that exemplifies the problems inherent in such systems that employ a variable optical retarder and passive viewing apparatus.

With reference to FIG. 1, stereoscopic imaging system 10 includes a light source 12, such as a cathode ray tube, that produces in alternate sequence first and second perspective view images of a scene. A first polarizing filter 14 is disposed face-to-face with screen 16 of cathode ray tube 12 and polarizes in a predetermined polarization state the light rays that emanate from screen 16. Polarizing filter 14 is a neutral linear polarizer with a vertical absorption axis 18 and a horizontal transmission axis 20.

The light rays carrying the first and second images exit polarizing filter 14 through its transmission axis 20 and strike a variable optical retarding means or retarder 22, which is tuned to provide half-wave retardation for green light. The optic axis 23 of variable optical retarder 22 is disposed at substantially 45° angles with respect to polarization axes 18 and 20 of polarizing filter 14. A receiver 24 delivers to cathode ray tube 12 image information corresponding to the first and second perspective views of the scene and provides signals to a switching circuit 26 in synchronism with the delivery of such information.

Switching circuit 26 provides first and second output signals that are applied to variable optical retarder 22 to develop, respectively, first and second amounts of optical retardation. Variable optical retarder 22 provides essentially zero retardation in a field-aligned or "ON" state to transmit horizontally polarized light rays of the first image and substantially half-wave retardation in a partly relaxed or "OFF" state to transmit vertically polarized light rays of the second image.

Polarizing filter 14 and variable optical retarder 22 constitute an image encoding means that encodes the first image in light of a first polarization sense (i.e., horizontal polarization) and the second image in light of a second polarization sense (i.e., vertical polarization). The light rays exiting variable optical retarder 22 propagate through a transmission medium 28, such as air, and strike first and second viewing means 30 and 32, which are positioned alongside of each other and form the eyepieces for glasses that are worn by an observer. First viewing means 30 comprises a second neutral linear polarizing filter having a vertical transmission axis 34 and a horizontal absorption axis 36, and second viewing means 32 comprises a third neutral linear polarizing filter having an absorption axis 38 and a transmission axis 40. In display system 10, absorption axis 38 and transmission axis 40 are oriented in the vertical and horizontal directions, respectively.

Whenever variable optical retarder 22 provides essentially zero retardation in the "ON" state, the horizontally polarized light rays carrying the first image propagate through transmission medium 28 and strike polarizing filters 30 and 32. Absorption axis 36 of polarizing filter 30 blocks the first image from the observer's left eye 42, and transmission axis 40 of polarizing filter 32 transmits the first image to the observer's right eye 44.

Whenever variable optical retarder 22 provides approximately half-wave retardation in the "OFF" state, the vertically polarized light rays carrying the second image propagate through transmission medium 28 and strike polarizing filters 30 and 32. Transmission axis 34 of polarizing filter 30 transmits the second image to the observer's left eye 42, and absorption axis 38 of polarizing filter 32 blocks the second image from the observer's right eye 44.

Polarizing filters 30 and 32 constitute an image decoding means that presents the first and second images to the observer's right eye 44 and left eye 42, respectively. Alternately blocking and transmitting the perspective view image for each eye creates the visual effect of a three-dimensional image of the scene.

The problem inherent in stereoscopic imaging system 10 is that variable optical retarder 22 has a slight amount of residual retardation in the "ON" state and provides substantially half-wave retardation for light of only one color in the "OFF" state. These characteristics of variable optical retarder 22 have the following effects. When it is in the "ON" state, variable optical retarder 22 does not cause an exact horizontal orientation of the light rays carrying the first image, which leaks through vertical transmission axis 34 of polarizing filter 30 to the observer's left eye 42. When it is in the "OFF" state, variable optical retarder 22 provides a substantially vertical orientation of light of only one color carrying the second image, which leaks through transmission axis 40 of polarizing filter 32 to the observer's right eye 44 if a phosphor of the broadband type (e.g., a P-4 type phosphor) is employed in screen 16 of cathode ray tube 12.

Figure 2A:
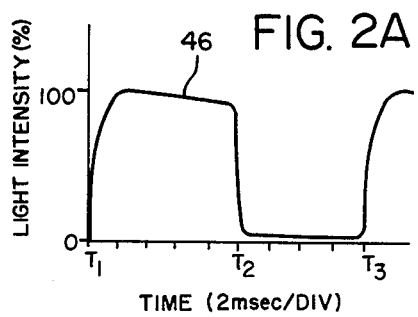
FIGS. 2A and 2B show the optical response characteristics of the system of FIG. 1 with the variable optical retarder in, respectively, the "ON" state and the "OFF" state.
Figure 2B:
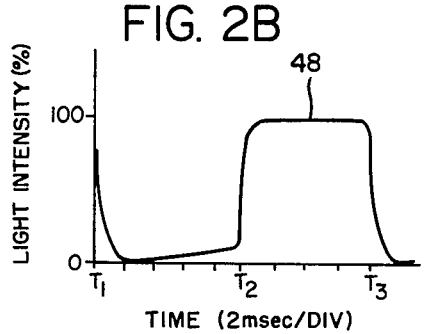

FIGS. 2A and 2B show the optical response characteristics 46 and 48 of polarizing filter 30 and polarizing filter 32, respectively, when the light rays carrying the first and second images strike them.

With reference to FIG. 2A, response characteristic 46 indicates that from $T_1$ to $T_2$, the observer sees through his left eye the second image of relatively high intensity; and from $T_2$ to $T_3$, the observer sees through his left eye the first image of relatively low intensity. With reference to FIG. 2B, response characteristic 48 indicates that from $T_1$ to $T_2$, the observer sees through his right eye the second image of relatively low intensity; and from $T_2$ to $T_3$, the observer sees through his right eye the first image of relatively high intensity.

The leakage of the first image to the left eye from $T_2$ to $T_3$ results from the residual retardation developed by variable optical retarder 22 in the "ON" state, and the leakage of the second image to the right eye from $T_1$ to $T_2$ results from the substantially half-wave retardation of light of only one color developed by variable optical retarder 22 in the "OFF" state. FIGS. 2A and 2B represent the performance of imaging system 10 that receives 470 nanometer light and employs a variable optical retarder 22 that is tuned to provide half-wave retardation of 513 nanometer (green) light. FIG. 2A shows about 5% transmission of light to the left eye from $T_2$ to $T_3$, and FIG. 2B shows about 5–10% transmission of light to the right eye from $T_1$ to $T_2$.

Figure 3:
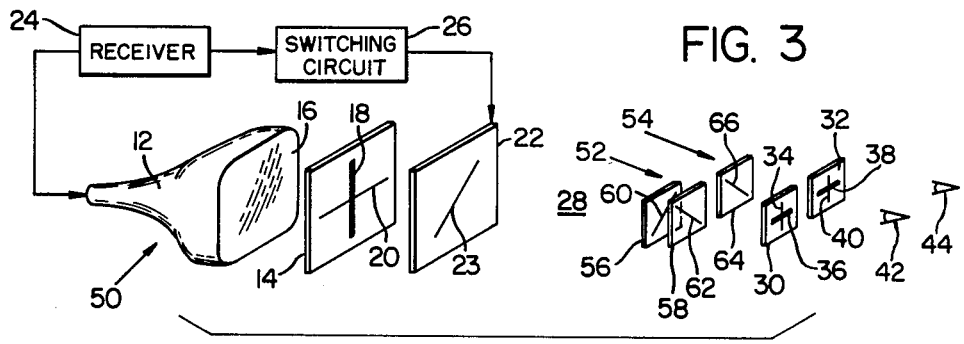
FIG. 3 is a diagram of a first preferred embodiment of a stereoscopic imaging system of the present invention.

FIG. 3 is a diagram of a first preferred embodiment of a stereoscopic imaging system 50 of the present invention which overcomes the problems described above for imaging system 10.

With reference to FIG. 3, the apparatus for producing the first and second perspective view images of the scene and the image encoder comprising polarizing filter 14 and variable optical retarder 22 are the same as those described for display system 10 of FIG. 1. The half-image decoding means of imaging system 50 comprises first and second viewing means 52 and 54 that are positioned in front of the observer's left eye 42 and right eye 44, respectively.

Viewing means 52 is designed to block the second image from left eye 42 when variable optical retarder 22 is in the "ON" state. This is accomplished by subtracting the residual retardation developed by variable optical retarder 22 in the "ON" state at the observer's left eye by employing a first optical retarding means that includes a pair of fixed retardation plates 56 and 58 whose respective optic axes 60 and 62 are aligned perpendicular to each other. Retardation plates 56 and 58 are selected so that the difference in retardation between them equals the residual retardation of variable optical retarder 22 in the "ON" state. The retardation of retardation plate 58 is, therefore, greater than that of retardation plate 56. Optic axis 60 of retardation plate 56 is parallel to optic axis 23 of variable optical retarder 22. Retardation plates 56 and 58 are disposed face-to-face to polarizing filter 30 as respects its surface opposite the one viewed by the observer's left eye 42.

Retardation plates 56 and 58 can also be combined as a single retardation plate whose retardation is equal to about the amount of residual retardation of variable optical retarder 22 in the "ON" state. The optic axis of such single retardation plate would be perpendicular to optic axis 23 of variable optical retarder 22.

The orientation of polarizing filter 30 relative to polarizing filter 14 is the same in both imaging systems 10 and 50.

Viewing means 54 is designed to block the first image from the right eye 44 when variable optical retarder 22 is in the "OFF" state. This is accomplished by employing a second optical retarding means that includes a fixed half-wave retardation plate 64 in front of the observer's right eye. Polarizing filter 32 is rotated 90° in its surface plane relative to its position in imaging system 10 of FIG. 1 so that absorption axis 38 of polarizing filter 32 is perpendicular to absorption axis 18 of polarizing filter 14. Half-wave plate 64 is disposed face-to-face to polarizing filter 32 as respects its surface opposite the one viewed by the observer's right eye 44. The optic axis 66 of half-wave retardation plate 64 is parallel to optic axis 62 of retardation plate 58.

To achieve the desired amount of image suppression, variable optical retarder 22 is, therefore, tuned to provide half-wave retardation of the wavelength to which half-wave retardation plate 64 is tuned.

Figure 4A:
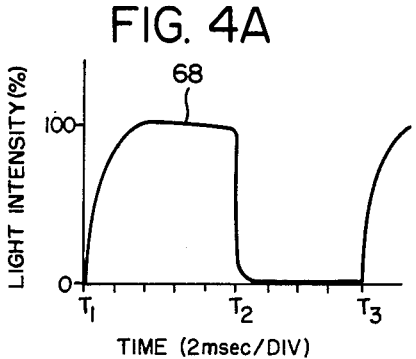
FIGS. 4A and 4B show the optical response characteristics of the imaging system of FIG. 3 in, respectively, the "ON" state and the "OFF" state FIGS. 5A-5C a comparison between the optical response characteristics of the imaging systems of FIGS. 1 and 3 for light wavelengths of, respectively, 440 nanometers, 513 nanometers, and 620 nanometers as seen by one of the observer's eyes.
Figure 4B:
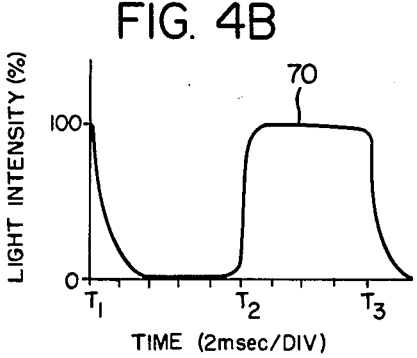

FIGS. 4A and 4B show the optical response characteristics 68 and 70 of viewing means 52 and viewing means 54, respectively, when the light rays carrying the first and second images strike them. The optical response characteristics of FIGS. 4A and 4B correspond to those of FIG. 2A and FIG. 2B, respectively. FIG. 4A shows that when variable optical retarder 22 is in the "ON" state from $T_2$ to $T_3$, the transmission of the first image to the left eye is reduced to about 1%. FIG. 4B shows that when variable optical retarder 22 is in the "OFF" state from $T_1$ to $T_2$, the transmission of the second image to the right eye is reduced to about 1.5%.

Figure 5A:
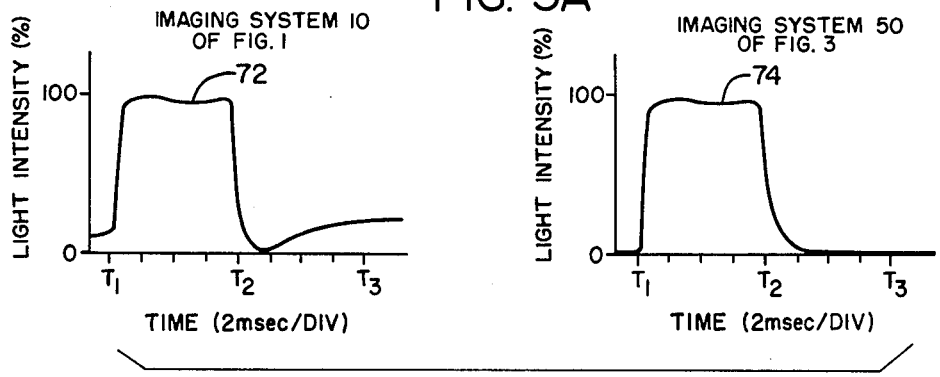
Figure 5B:
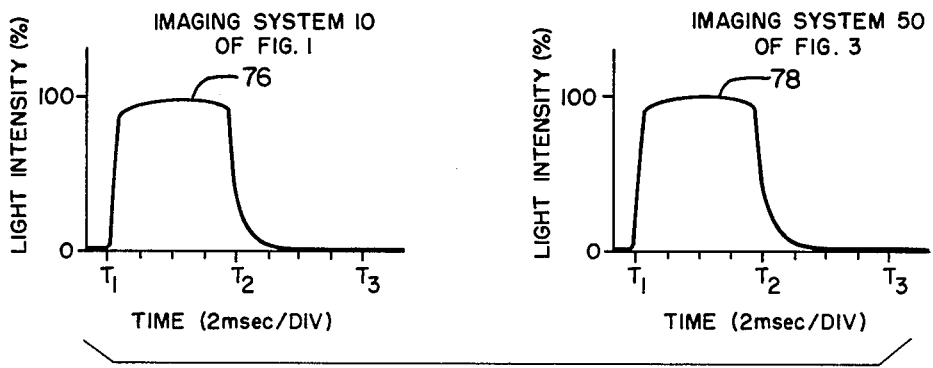
Figure 5C:
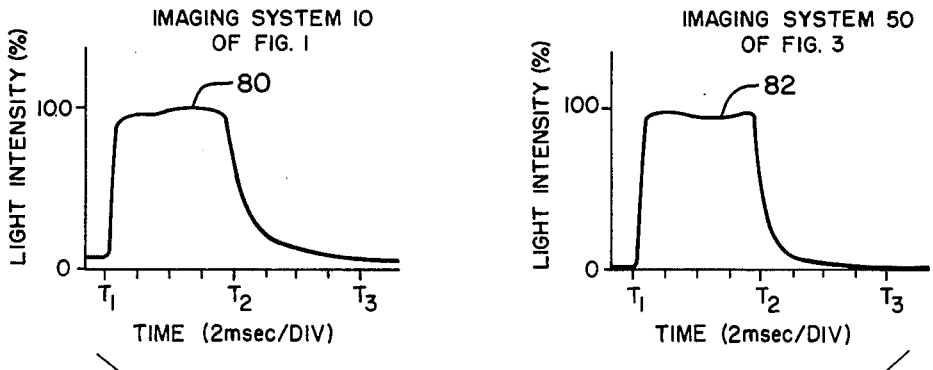

FIGS. 5A–5C present a comparison between the optical response characteristics of the imaging system 10 of FIG. 1 and imaging system 50 of FIG. 3 for light wavelengths of, respectively, 440 nanometers, 513 nanometers, and 620 nanometers, as seen by the observer's right eye. The variable optical retarders employed in imaging systems 10 and 50 are tuned to provide half-wave retardation of 513 nanometer (green) light. Half-wave plate 64 is selected to provide half-wave retardation of green light.

Optical response characteristics 74, 78, and 82 of FIGS. 5A, 5B, and 5C, respectively, indicate that imaging system 50 of FIG. 3 exhibits essentially complete extinction of the second image to the right eye from $T_2$ to $T_3$ over a wide range of colors and, therefore, is suitable for full color and broadband phosphor applications. On the other hand, optical response characteristics 72 and 80 of FIGS. 5A and 5C, respectively, indicate that imaging system 10 of FIG. 1 suffers from leakage of the second image in different colors from that to which variable optical retarder 22 is tuned. Optical response characteristic 76 of FIG. 5B exhibits essentially complete extinction of the second image from $T_2$ to $T_3$ because variable optical retarding means 22 is tuned to provide substantially half-wave retardation of 513 nanometer light.

Figure 6:
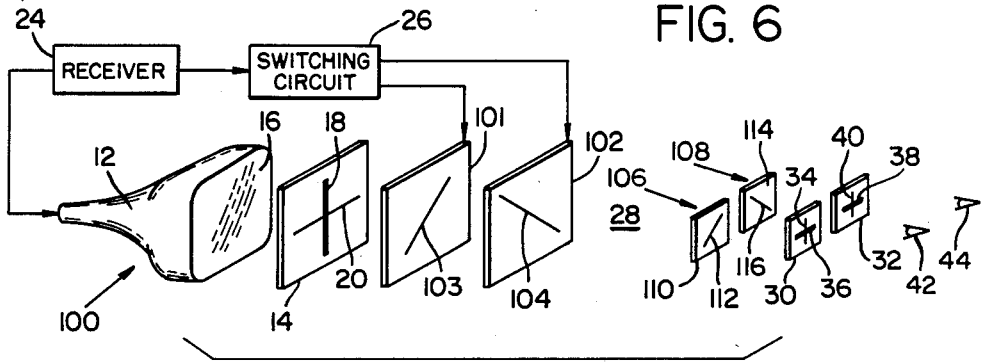
FIG. 6 is a diagram of a second preferred embodiment of a stereoscopic imaging system of the present invention.

FIG. 6 is a diagram of a second preferred embodiment of a stereoscopic imaging system 100 of the present invention. Imaging system 100 is a modification of imaging system 50 and has reduced image contrast sensitivity that results from the observer's head tilt motion. The apparatus for developing the first and second perspective view images of the scene and the image encoding means of imaging system 100 differs from that of imaging systems 10 and 50 of FIGS. 1 and 3, respectively, in the following respects.

The variable optical retarding means comprises first and second variable retarders 101 and 102 that are positioned face-to-face and together with polarizing filter 14 comprise the image encoding means. Optic axis 103 of variable retarder 101 is aligned perpendicular to the optic axis 104 of variable retarder 102.

Switching circuit 26 provides separate switching signals to variable retarders 101 and 102. Each one of variable retarders 101 and 102 develops in response to the switching signals either essentially zero retardation in the "ON" state or substantially quarter-wave retardation in the "OFF" state. Whenever the light rays carrying the first image exit horizontal transmission axis 20 of polarizing filter 14, switching circuit 26 applies signals to command variable retarder 101 to develop essentially zero retardation in the "ON" state and variable retarder 102 to develop substantially quarter-wave retardation in the "OFF" state of the light rays passing through them. Under these conditions, the light rays of the first image exiting variable retarder 102 are right-circularly polarized as they propagate through transmission medium 28. Whenever the light rays carrying the second image exit horizontal transmission axis 20 of polarizing filter 14, switching circuit 26 applies signals to command variable retarder 101 to develop substantially quarter-wave retardation in the "OFF" state and variable retarder 102 to develop essentially zero retardation in the "ON" state of the light rays passing through them. Under these conditions, the light rays of the second image exiting variable retarder 102 are left-circularly polarized as they propagate through transmission medium 28.

The variable optical retarding means comprising variable retarders 101 and 102 encode, therefore, the first image in circularly polarized light of a first polarization sense (right-circular polarization) and the second image in circularly polarized light of a second polarization sense (left-circular polarization). The net retardation of variable retarders 101 and 102 is substantially one-quarter wavelength during steady state operation of the imaging system.

The image decoding means comprises a first viewing means 106 and a second viewing means 108. Viewing means 106 is positioned in front of the observer's left eye 42 and comprises a first optical retarding means or quarter-wave plate 110 and polarizing filter 30. The optic axis 112 of quarter-wave plate 110 is aligned parallel to optic axis 103 of variable retarder 101. Viewing means 108 is positioned in front of the observer's right eye 44 and comprises a second optical retarding means or quarter-wave plate 114 and polarizing filter 32. The optic axis 116 of quarter-wave plate 114 is aligned parallel to optic axis 104 of variable retarder 102. Polarizing filters 30 and 32 are oriented in the same position relative to vertical absorption axis 18 of polarizing filter 14 as described for imaging system 50 of FIG. 3.

Whenever variable retarder 101 is commanded to produce essentially zero retardation, the right-circularly polarized light rays of the first image strike quarter-wave plates 110 and 114. Since optic axis 112 of quarter-wave plate 110 is orthogonally aligned with optic axis 104 of variable retarder 102, the right-circularly polarized light rays are converted into horizontal linearly polarized light and are absorbed by absorption axis 36 of polarizing filter 30. Light rays of the first image are, therefore, blocked from the observer's left eye 42 by viewing means 106. Since optic axis 116 of quarter-wave plate 114 is aligned in parallel with optic axis 104 of variable retarder 102, the right-circularly polarized light rays are converted into vertical linearly polarized light and are transmitted by transmission axis 40 of polarizing filter 32. Light rays of the first image are, therefore, transmitted to the observer's right eye 44 by viewing means 108.

Whenever variable retarder 102 is commanded to produce essentially zero retardation, the left-circularly polarized light rays of the second image strike quarter-wave plates 110 and 114. Since optic axis 112 of quarter-wave plate 110 is aligned in parallel with optic axis 103 of variable retarder 101, the left-circularly polarized light rays are converted into vertical linearly polarized light and are transmitted by transmission axis 34 of polarizing filter 30. Light rays of the second image are, therefore, transmitted to the observer's left eye 42 by viewing means 106. Since optic axis 116 of quarter-wave plate 114 is orthogonally aligned with optic axis 103 of variable retarder 101, the left-circularly polarized light rays are converted into horizontal linearly polarized light and are absorbed by absorption axis 38 of polarizing filter 32. Light rays of the second image are, therefore, blocked from the observer's right eye 44 by viewing means 108.

It will be appreciated that only circularly polarized light propagates through transmission medium 28. If viewing means 106 and 108 constitute first and second eyepieces positioned alongside of each other in the form of viewing glasses to be worn by an observer, the circular polarization decreases the image contrast sensitivity that results from head tilt motion by the observer wearing the glasses.

Figure 7:
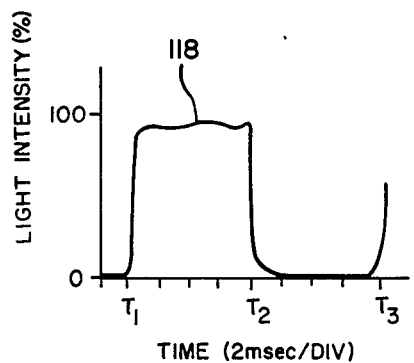
FIG. 7 shows the optical response characteristic of the imaging system of FIG. 6 as seen by one of the observer's eyes.

FIG. 7 shows the optical response characteristic of imaging system 100 through either the left eye or the right eye. Optical response characteristic 118 of FIG. 7 indicates that the transition times at $T_1$ and $T_2$ are essentially uniform at about 0.5 milliseconds. The extinction of light from $T_2$ to $T_3$ is better than that shown in FIGS. 4A and 4B and provides a uniform contrast of about 50 to 1 over a wide range of wavelengths.

Imaging system 100 functions optimally when variable retarders 101 and 102 are tuned to match the wavelength of quarter-wave plates 110 and 114. Quarter-wave plates 110 and 114 are selected to provide quarter-wave retardation of green light because of its mid-spectrum position. The above-described specification and orientation of variable retarders 101 and 102 and quarter-wave plates 110 and 114 (1) ensures that light of zero net retardation strikes a viewing means that covers an eye that is intended to receive no light and (2) reduces the residual retardation of the variable retarder that is commanded to the "ON" state. Satisfying these criteria provides an imaging system that can be used with perspective view color images or with a broadband image source phosphor.

The preferred embodiments of the present invention incorporate at least one liquid crystal cell operating as a variable optical retarder that controls the retardation of light passing therethrough in response to the intensity of an electric field produced by an excitation voltage applied to the cell electrode structures. The liquid crystal cell is capable of switching between optical retardation states in the relatively short transition times indicated above.

Figure 8:
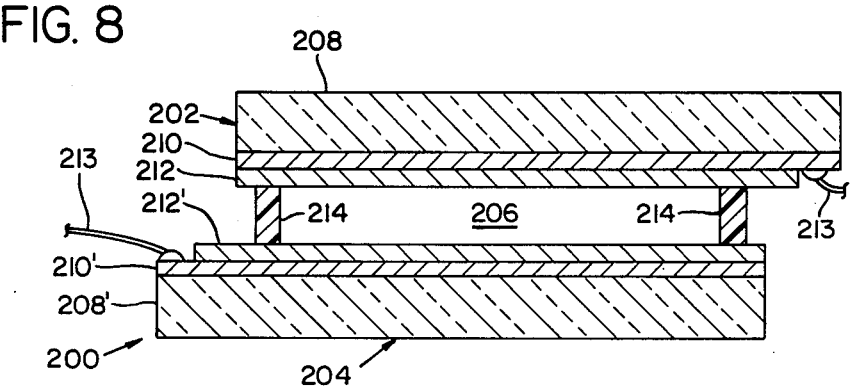
FIG. 8 is a diagrammatic cross-sectional side elevation view of the liquid crystal cell that is used as a variable optical retarder in the preferred embodiment of the present invention.

With reference to FIG. 8, liquid crystal cell 200 includes a pair of generally parallel, spaced-apart electrode structures 202 and 204 with nematic liquid crystal material 206 included therebetween. Electrode structure 202 comprises glass dielectric substrate 208 that has on its inner surface a layer 210 of electrically conducting, but optically transparent, material such as indium tin oxide. Director alignment film layer 212 is applied to conductive layer 210 and forms a boundary between electrode structure 202 and liquid crystal material 206. The surface of film 212 which contacts the liquid crystal material is conditioned in accordance with one of two preferred methods to promote a preferred orientation of the directors of the liquid crystal material in contact therewith. The materials constituting and the corresponding methods of conditioning the director alignment film 212 are described in detail hereinbelow. Electrode structure 204 is of a construction similar to that of electrode structure 202, and the components corresponding to those of electrode structure 202 are shown with identical reference numerals followed by primes.

The short length edges of electrode structures 202 and 204 are offset relative to each other to provide access to conductive layers 210 and 210′ for connecting at terminals 213 the output conductors of switching circuit 26. Spacers 214 may be comprised of any suitable material such as glass fiber to preserve the general parallel relation between electrode structures 202 and 204.

With reference to FIGS. 9A–9C, the nematic director alignment configuration of layers 212 and 212′ in liquid crystal cell 200 is described in Column 7, lines 48–55 of U.S. Pat. No. 4,333,708 of Boyd, et al. It will be understood, however, that the liquid crystal cell described in the Boyd, et al. patent differs from that used in the present invention in that the former includes an alternating-tilt geometry type configuration of which the director alignment of cell 200 comprises only a portion. The cell of the Boyd, et al. patent is constructed to promote disclination movement within the cell in an attempt to provide a bistable switching device.

The film layer 212 of electrode structure 202 is conditioned so that the electrode structure surface contacting directors 216 are aligned parallel to each other at a tilt bias angle $+\theta$, which is measured in the counterclockwise sense with reference to the surface of film layer 212. The film layer 212′ of electrode structure 204 is conditioned so that the electrode structure surface contacting directors 218 are aligned parallel to each other at a tilt bias angle $-\theta$, which is measured in the clockwise sense with reference to the surface of film layer 212′. Thus, liquid crystal cell 200 is fabricated so that the surface contacting directors 216 and 218 of the opposed surfaces of director alignment layers 212 and 212′ of electrode structures 202 and 204, respectively, are tilt-biased in opposite directions.

A first preferred method of effecting the desired alignment of the surface contacting directors entails the use of polyimide as the material that comprises the alignment film layers 212 and 212′ on electrode structures 202 and 204, respectively. Each alignment film layer is rubbed to produce a tilt bias angle $|\theta|$, with 2° to 5° being the preferred range. A second preferred method of effecting the desired alignment of the surface contacting directors entails the use of silicon monoxide as the material which comprises the alignment film layers 212 and 212′ of electrode structures 202 and 204, respectively. The silicon monoxide layer is evaporated and vapor deposited preferably at a 5° angle measured from the electrode structure surface in an amount sufficient to produce a tilt bias angle $|\theta|$ of between 10° to 30°, with 15° to 25° being the preferred range.

It will be appreciated that methods for depositing silicon monoxide or other alignment materials to align liquid crystal molecules in a predetermined direction have been disclosed previously by others and are known to those having ordinary skill in the art. One such method, for example, is disclosed in U.S. Pat. No. 4,165,923 of Janning.

FIG. 9A depicts the orientation of surface noncontacting directors 220 when an AC signal $V_1$ of approximately 2 kHz and 20 Vrms is applied to conductive layers 210 and 210′ of electrode structures 202 and 204, respectively. The signal $V_1$ on conductive layer 210′ with conductive layer 210 grounded constitutes a first switching state produced at the output of switching circuit 26 and produces an alternating electric field, E, between electrode structures 202 and 204 within the liquid crystal cell 200 to force the cell into its "ON" optical retardation state. A substantial number of the surface noncontacting directors 220 of a liquid crystal material 206 that has a positive anisotropy value align essentially end-to-end along direction 221 of the electric field flux lines within the cell, which direction is normal to the conditioned surfaces of the electrode structures. Thus, when cell 200 is excited into its "ON" state, the surface noncontacting directors 220 are aligned perpendicularly to the surfaces of the cell.

FIG. 9B depicts the orientation of surface noncontacting directors 220 after the signal $V_1$ is removed so that the alignment of surface noncontacting directors is influenced not by an electric field produced between electrode structures 202 and 204 within the cell, but by the intermolecular elastic forces which cause relaxation of the surface noncontacting directors from the end-to-end alignment of the "ON" state. The removal of signal $V_1$ constitutes a second switching state produced at the output of switching circuit 26. The director orientation shown in FIG. 9B corresponds to that of "OFF" optical retardation state of the cell.

Switching cell 200 to the "OFF" state can also be accomplished by applying to layer 210′ of the cell an AC signal $V_2$ produced at the output of switching circuit 26 having a voltage level which is less than that of signal $V_1$ and generally near 0 V. The frequency of signal $V_2$ is generally the same as that of signal $V_1$.

FIG. 9C depicts the orientation of surface noncontacting directors 220 in an "INTERMEDIATE" state, which represents an intermediate extent of relaxation between the end-to-end alignment of the "ON" state and the partly relaxed alignment of the "OFF" state.

During the transition from the "ON" state through the "INTERMEDIATE" state to the "OFF" state of the liquid crystal cell, the surface noncontacting directors recede from the end-to-end alignment normal to the electrode structure surfaces and attempt to assume a generally parallel relation with the adjacent directors. Thus, surface noncontacting directors 220$a$ and 220$b$ rotate in a clockwise sense as shown by direction arrows 222$a$ in order to achieve a near-parallel relation as respects directors 216 and 220$a$, respectively; and surface noncontacting directors 220$c$ and 220$d$ rotate in a counterclockwise sense as shown by direction arrows 222$b$ to achieve a near-parallel relation as respects directors 218 and 220$c$, respectively. Thus, when cell 200 relaxes to its "OFF" state, each one of a substantial number of the surface noncontacting directors is aligned so that it projects a director component onto the surfaces of the cell. The surface noncontacting directors, however, lie approximately in a plane which is perpendicular to the surfaces of the cell.

The method of operating the liquid crystal cell 200 as a variable optical retarder is directed to the disclination-free surface noncontacting director relaxation from the electric field aligned or "ON" state depicted by FIG. 9A to the planar configuration or "OFF" state depicted by FIG. 9B. In the present invention, liquid crystal cell 200 is operated as either a zero to quarter-wave or a zero to half-wave retarder whose optic axis corresponds to the alignment direction of the surface noncontacting directors 220.

Linearly polarized light which propagates in direction 226 normal to the surfaces of electrode structures 202 and 204 is coincident with the direction of surface noncontacting directors 220 when the liquid crystal cell is in the "ON" state. Directors 220 are oriented in such "ON" state so that there is a negligible projection of the optic axis on the electrode structure surfaces of the cell. Under these conditions, liquid crystal cell 200 produces substantially reduced optical retardation for incident light propagating in the direction 226.

Linearly polarized light which propagates in direction 226 normal to the surfaces of electrode structures 202 and 204 is noncoincident with the alignment direction of surface noncontacting directors when the liquid crystal cell is in the "OFF" state. Directors 220 are oriented in such "OFF" state so that each one of a substantial number of them projects a component on the electrode structure surfaces of the cell. Under these conditions, liquid crystal cell 200 has an effective birefringence for generally normally incident light.

In imaging system 50 of FIG. 3, the orientation of surface noncontacting directors 220 of variable optical retarder 22 provides essentially half-wave optical retardation for light of the wavelength which satisfies the mathematical expression:

$$\frac{\Delta n d}{\lambda} = \frac{1}{2}$$

where d represents the thickness 228 and $\Delta n$ represents the effective birefringence of the cell. In imaging system 100 of FIG. 6, the orientation of surface noncontacting directors 220 of variable optical retarders 101 and 102 provides essentially quarter-wave optical retardation for light of the wavelength which satisfies the mathematical expression:

$$\frac{\Delta n d}{\lambda} = \frac{1}{4}$$

where d represents the thickness 228 and $\Delta n$ represents the effective birefringence of the cell.

It will be obvious to those having skill in the art that many changes may be made in the above-described details of the preferred embodiments of the present invention. The scope of the present invention, therefore, should be determined only by the following claims.

I claim:

1. A stereoscopic imaging system, comprising:
  a light source that produces different views of a scene, the views including first and second images; and
  image encoding means and passive image decoding means that are separated by a transmission medium, the image encoding means including light polarizing means and variable optical retarding means for providing optical retardation selectively in first and second amounts that differ by substantially one-half wavelength, the first amount encoding the first image in light of a first polarization sense and the second amount encoding the second image in light of a second polarization sense, and
  the image decoding means receiving the first and second images that propagate through the transmission medium and including first and second viewing means, the first viewing means comprising first optical retarding means for transmitting light of the first polarization sense and blocking light of the second polarization sense, and the second viewing means comprising second optical retarding means for transmitting light of the second polarization sense and blocking light of the first polarization sense, thereby selectively decoding the first and second images.

2. The system of claim 1 in which the light polarizing means comprises a first linear polarizing filter, the first viewing means comprises a second linear polarizing filter having orthogonally aligned transmission and adsorption polarization axes, and the second viewing means comprises a third linear polarizing filter having orthogonally aligned transmisson and absorption polarization axes.

3. The system of claim 1 in which the variable optical retarding means comprises at least one variable retarder, and one of the first and second retarding means comprises a first fixed retardation plate whose optic axis is aligned perpendicular to the optic axis of the one variable retarder.

4. The system of claim 1 in which the first and second retarding means comprise respective first and second fixed retardation plates and the variable optical retarding means provides a residual amount of retardation to develop light of one of the first and second polarization senses, the first retardation plate providing retardation of the residual amount and the second retardation plate providing half-wave retardation.

5. The system of claim 4 in which the optic axis of the half-wave retardation plate is aligned perpendicular to the optic axis of the variable optical retarding means.

6. The system of claim 1 in which each one of the first and second retarding means is a quarter-wave retardation plate.

7. The system of claim 6 in which the optic axes of the quarter-wave retardation plates are orthogonally aligned.

8. A stereoscopic image encoding and decoding system that receives different views of a scene, the views including first and second images carried by light emanating from an image source, comprising:
  first polarizing means for polarizing the light carrying the images;
  variable optical retarding means in optical communication with the first polarizing means;
  means in communication with the variable retarding means for receiving signals to selectively encode the first and second images, the variable retarding means providing in response to the signals optical retardation in first and second amounts that differ by substantially one-half wavelength, the first amount encoding the first image in light of a first polarization sense and the second amount encoding the second image in light of a second polarization sense and
  passive image decoding means for decoding the images encoded by the variable retarding means, the image decoding means including first and second viewing means, the first viewing means comprising first optical retarding means for transmitting light of the first polarization sense and blocking light of the second polarization sense, and the second viewing means comprising second optical retarding means for transmitting light of the second polarization sense and blocking light of the first polarization sense, thereby selectively decoding the first and second images.

9. The system of claim 8 in which the variable retarding means comprises a single variable retarder that provides half-wave retardation to develop light of one of the first and second polarization senses, and one of the first and second retarding means comprises a half-wave retardation plate.

10. The system of claim 9 in which the single variable retarder provides a residual amount of retardation to develop light of the other polarization sense, and the other one of the retarding means comprises a retardation plate providing retardation of the residual amount.

11. The system of claim 10 in which the other retarding means and the single variable retarder are aligned to compensate for the residual amount of retardation of the single variable retarder.

12. The system of claim 8 in which the first polarizing means, the first viewing means, and the second viewing means comprise respective first, second, and third linear polarizing filters, each one of the polarizing filters having orthogonally aligned transmission and absorption axes, the absorption axis of the first polarizing filter being perpendicular to the absorption axes of the second and third polarizing filters.

13. The system of claim 8 in which the variable retarding means comprises first and second variable retarders and has a net retardation of one-quarter wavelength, and the first and second viewing means comprise respective first and second quarter-wave plates whose optic axes are aligned perpendicular to each other.

14. The system of claim 13 in which the first and second variable retarders provide essentially zero and quarter-wave retardation in alternate sequence to encode the first and second images.

15. A stereoscopic image encoding and decoding system that receives different views of a scene, the views including first and second images carried by light emanating from an image source, comprising:
first polarizing means for subjecting the light carrying the first and second images to a predetermined state of polarization;
variable optical retarding means including first and second variable retarders for encoding the first image in circularly polarized light of a first polarization sense and the second image in circularly polarized light of a second polarization sense; and
image decoding means for decoding the first and second images encoded by the variable retarding means, the image decoding means including first and second viewing means that are positioned alongside of each other, the first viewing means removing the circular polarization of the first sense while transmitting one of the first and second images and blocking the other image, and the second viewing means removing the circular polarization of the second sense while blocking the one image and transmitting the other image.

16. The system of claim 15 in which the first polarizing means is a first linear polarizing filter.

17. The system of claim 15 in which the first and second viewing means comprise respective second and third linear polarizing filters, each one of the polarizing filters having orthogonally aligned transmission and absorption axes, the absorption axis of the second polarizing filter being parallel to the absorption axis of the third polarizing filter.

18. The system of claim 15 in which the first and second variable retarders have orthogonally aligned optic axes and the variable optical retarding means has a net retardation of one-quarter wavelength during steady-state operation of the system.

19. The system of claim 18 in which the first variable retarder provides essentially zero retardation and the second variable retarder provides substantially quarter-wave retardation to develop circularly polarized light of the first polarization sense, and the first variable retarder provides substantially quarter-wave retardation and the second variable retarder provides essentially zero retardation to develop circularly polarized light of the second polarization sense.

20. The system of claim 18 in which the first and second viewing means comprise respective first and second quarter-wave plates whose optic axes are aligned perpendicular to each other.

21. The system of claim 18 in which one of the first and second variable retarders includes a liquid crystal cell comprising liquid crystal material contained between a pair of opposed electrode structures, each electrode structure having an inner surface that includes a director alignment layer which has been conditioned so that the directors of the liquid crystal material in contact therewith become substantially uniformly aligned to form tilt bias angles with the conditioned surfaces, the tilt bias angles of the directors in contact with one conditioned surface being defined in a rotational sense opposite to that of the tilt bias angles of the directors in contact with the other conditioned surface.

22. A passive decoder for decoding images representing different views of a scene, comprising:
first and second viewing means, each one of the first and second viewing means including a fixed retarding means and a linear polarizing filter having orthogonally aligned transmission and absorption axes, the absorption axis of one of the polarizing filters being aligned parallel to the absorption axis of the other polarizing filter.

23. The decoder of claim 22 in which the fixed retarding means are quarter-wave plates whose optic axes are aligned perpendicular to each other.

24. The decoder of claim 22 in which one of the fixed retarding means is a half-wave plate.

25. The decoder of claim 24 in which the other fixed retarding means comprises two retardation plates and provides an amount of retardation that equals the difference between the retardations of two plates.

26. A stereoscopic imaging system, comprising:
a light source that produces different views of a scene, the views including first and second images; and
image encoding means and passive image decoding means that are separated by a transmission medium,
the image encoding means including light polarization means and variable optical retarding means for selectively encoding the first image in light of a first polarization sense and the second image in light of a second polarization sense, and
the image decoding means receiving the first and second images that propagate through the transmission medium and including first and second viewing means, the first viewing means comprising first optical retarding means for transmitting light of the first polarization sense and blocking light of the second polarization sense and the second viewing means comprising second optical retarding means for transmitting light of the second polarization sense and blocking light of the first polarization sense, and the first and second retarding means comprising respective first and second fixed retardation plates and the variable optical retarding means providing a residual amount of retardation to develop light of one of the first and second polarization senses, the first retardation plate providing retardation of the residual amount and the second retardation plate providing half-wave retardation, thereby selectively decoding the first and second images.

27. The system of claim 26 in which the optic axis of the half-wave retardation plate is aligned perpendicular to the optic axis of the variable optical retarding means.

28. A stereoscopic image encoding and decoding system that receives different views of a scene, the views including first and second images carried by light emanating from an image source, comprising:
   first polarizing means for polarizing the light carrying the images;
   variable optical retarding means comprising a single variable retarder in optical communication with the first polarizing means;
   means in communication with the variable retarding means for receiving signals to selectively encode the first and second images, the variable retarding means in response to the signals encoding the first image in light of a first polarization sense and the second image in light of a second polarization sense and providing half-wave retardation to develop light of one of the first and second polarization senses and a residual amount of retardation to develop light of the other polarization sense; and
   passive image decoding means for decoding the images encoded by the variable retarding means, the image decoding means including first and second viewing means, the first viewing means comprising first optical retarding means for transmitting light of the first polarization sense and blocking light of the second polarization sense and the second viewing means comprising second optical retarding means for transmitting light of the second polarization sense and blocking light of the first polarization sense, and one of the first and second retarding means comprising a half-wave retardation plate and the other one of the retarding means comprising a retardation plate providing retardation of the residual amount, thereby selectively decoding the first and second images.

29. The system of claim 28 in which the other retarding means and the single variable retarder are aligned to compensate for the residual amount of retardation of the single variable retarder.

30. A stereoscopic image encoding and decoding system that receives different views of a scene, the views including first and second images carried by light emanating from an image source, comprising:
   first polarizing means for polarizing the light carrying the images, the first polarizing means comprising a linear polarizing filter having orthogonally aligned transmission and absorption axes;
   variable optical retarding means in optical communication with the first polarizing means;
   means in communication with the variable retarding means for receiving signals to selectively encode the first and second images, the variable retarding means in response to the signals encoding the first image in light of a first polarization sense and the second image in light of a second polarization sense; and
   passive image decoding means for decoding the images encoded by the variable retarding means, the image decoding means includng first and second viewing means that comprise respective first and second linear polarizing filters having orthonally aligned transmission and absorption axes, the absorption axes of the second and third polarizing filters being perpendicular to the absorption axis of the first polarizing filter, and the first viewing means further comprising first optical retarding means for transmitting light of the first polarization sense and blocking light of the second polarization sense and the second viewing means further comprising second optical retarding means for transmitting light of the second polarization sense and blocking light of the first polarization sense, thereby selectively decoding the first and second images.

31. A stereoscopic image encoding and decoding system that receives different views of a scene, the views including first and second images carried by light emanating from an image source, comprising:
   first polarizing means for polarizing the light carrying the images;
   variable optical retarding means in optical communication with the first polarizing means, the variable retarding means comprising first and second variable retarders and having a net retardation of one-quarter wavelength;
   means in communication with the variable retarding means for receiving signals to selectively encode the first and second images, the variable retarding means in response to the signals encoding the first image in light of a first polarization sense and the second image in light of a second polarization sense; and
   passive image decoding means for decoding the images encoded by the variable retarding means, the image decoding means including first and second viewing means comprising respective first and second quarter-wave plates whose optic axes are aligned perpendicular to each other, the first viewing means further comprising first optical retarding means for transmitting light of the first polarization sense and blocking light of the second polarization sense and the second viewing means further comprising second optical retarding means for transmitting light of the second polarization sense and blocking light of the first polarization sense, thereby selectively decoding the first and second images.

32. The system of claim 31 in which the first and second variable retarders provide essentially zero and quarter-wave retardation in alternate sequence to encode the first and second images.

33. A stereoscopic image encoding and decoding system that receives different views of a scene, the views including first and second images carried by light emanating from an image source, comprising:
   first polarizing means for subjecting the light carrying the first and second images to a predetermined state of polarization;
   variable optial retarding means for encoding the first image in circularly polarized light of a first polarization sense and the second image in circularly polarized light of a second polarization sense, the variable retarding means comprising first and second variable retarders with orthogonally aligned optical axes and having a net retardation of one-quarter wavelength during steady-state operation of the system; and image decoding means for decoding the first and second image encoded by the variable retarding means, the image decoding means including first and second viewing means that are positioned alongside of each other, the first viewing means removing the circular polarization of the first sense while transmitting one of the first and second images and blocking the other image, and the second viewing means removing the circular polarization of the second sense while blocking the one image and transmitting the other image.

34. The system of claim 33 in which the first variable retarder provides essentially zero retardation and the second variable retarder provides substantially quarter-wave retardation to develop circularly polarized light of the first polarization sense, and the first variable retarder provides substantially quarter-wave retardation and the second variable retarder provides essentially zero retardation to develop circularly polarized light of the second polarization sense.

35. The system of claim 33 in which the first and second viewing means comprises respective first and second quarter-wave plates whose optic axes are aligned perpendicular to each other.

36. A stereoscopic image encoding and decoding system that receives different views of a scene, the views including first and second images carried by light emanating from an image source, comprising:

first polarizing means for subjecting the light carrying the first and second images to a predetermined state of polarization;

variable optical retarding means for encoding the first image in circularly polarized light of a first polarization sense and the second image in circularly polarized light of a second polarization sense, the variable optical retarding means comprising first and second variable retarders with orthogonally aligned optic axes and having as net retardation of one-quarter wavelength during steady-state operation of the system, and one of the first and second variable retarders means including a liquid crystal cell comprising liquid crystal material contained between a pair of opposed electrode structures, the inner surface of each electrode structure including a director alignment layer which has been conditioned so that the directors of the liquid crystal material in contact therewith become substantially uniformly aligned to form tilt bias angles with the conditioned surfaces, the tilt bias angles of the directors in contact with one conditioned surface being defined in a rotational sense opposite to that of the tilt bias angles of the directors in contact with the other conditioned surface; and image decoding means for decoding the first and second images encoded by the variable retarding means, the image decoding means including first and second viewing means that are positioned alongside of each other, the first viewing means removing the circular polarization of the first sense while transmitting one of the first and second images and blocking the other image, and the second viewing means removing the circular polarization of the second sense while blocking the one image and transmitting the other image.

37. A stereoscopic imaging system, comprising:

a light source that produces different views of a scene, the views including first and second images; and image encoding means and passive image decoding means that are separated by a transmission medium, the image encoding means including light polarizing means and variable optical retarding means for selectively encoding the first image in light of a first polarization sense and the second image in light of a second polarization sense, and the image decoding means receiving first and second images that propagate through the transmission medium and including:

first viewing means operative for transmitting light carrying the first image and blocking light carrying the second image and including first means for compensating for optical characteristics of the variable optical retarding means and for preventing leakage of light carrying the second image, and second viewing means operative for transmitting light carrying the second image and blocking light carrying the first image and including second means for compensating for optical characteristics of the variable optical retarding means and for preventing leakage of light carrying the first image.

38. The system of claim 37 in which the first and second means for compensating for the optical characteristics of the variable optical retarding means and for preventing light leakage comprises respective first and second fixed optical retarding means.

39. The system of claim 38 in which one of the first and second fixed optical retarding means provides an amount of retardation that compensates for residual retardation of the variable optical retarding means.

40. The system of claim 38 in which one of the first and second fixed optical retarding means provides an amount of retardation that compensates for chromatic effects of the variable optical retarding means.

41. The system of claim 38 in which the variable optical retarding means comprises a pair of zero to quarter-wave optical retarders having perpendicularly aligned optical axes, and the first and second fixed optical retarding means comprise quarter-wave plates.

* * * * *